United States Patent [19]

Bird

[11] Patent Number: 4,837,788
[45] Date of Patent: Jun. 6, 1989

[54] REPEATER FOR EXTENDING LOCAL AREA NETWORKS

[75] Inventor: Wiley M. Bird, El Toro, Calif.

[73] Assignee: Ford Aerospace & Communications Corporation, Newport Beach, Calif.

[21] Appl. No.: 796,388

[22] Filed: Nov. 8, 1985

[51] Int. Cl.[4] .......................................... H04L 25/20
[52] U.S. Cl. ........................................ 375/3; 370/85; 370/97; 178/71 R
[58] Field of Search ...................... 370/75, 97, 26, 35, 370/75, 85, 124, 16, 93; 364/200, 900; 178/73, 2 R, 71 R; 379/344, 345; 375/3, 3.1, 4

[56] References Cited

U.S. PATENT DOCUMENTS

| | | | |
|---|---|---|---|
| 3,435,142 | 3/1969 | Crowson et al. | 178/73 |
| 3,443,022 | 5/1969 | Benowitz et al. | 178/2 R |
| 3,614,318 | 10/1971 | Klose | 178/68 |
| 3,657,478 | 4/1972 | Andrews | 178/63 |
| 3,721,763 | 3/1973 | Homan et al. | 178/58 |
| 3,832,489 | 8/1974 | Krishna | 178/71 R |
| 3,843,834 | 10/1974 | Burke | 178/58 |
| 3,967,059 | 6/1976 | Moore, III et al. | 178/58 |
| 3,973,240 | 8/1976 | Fong | 375/3 |
| 4,012,593 | 3/1977 | Yamaguchi | 178/71 R |
| 4,070,545 | 1/1978 | Diefenderfer | 370/97 |
| 4,099,024 | 7/1978 | Boggs et al. | 178/71 |
| 4,154,978 | 5/1979 | Tu | 178/71 |
| 4,242,542 | 12/1980 | Kimbrough | 370/75 |
| 4,254,496 | 3/1981 | Munter | 370/85 X |
| 4,271,505 | 6/1981 | Menot et al. | 370/85 |
| 4,346,452 | 8/1982 | Groves | 364/900 |
| 4,464,749 | 8/1984 | Ulug | 370/85 |
| 4,509,199 | 4/1985 | Ichihara | 370/97 |
| 4,513,373 | 4/1985 | Sheets | 364/200 |
| 4,538,262 | 8/1985 | Sinniger et al. | 370/85 |
| 4,542,501 | 9/1985 | Chevalet et al. | 370/85 |
| 4,554,657 | 11/1985 | Wilson | 370/93 |
| 4,577,327 | 3/1986 | Nambu | 375/4 |
| 4,598,410 | 7/1986 | Smith et al. | 375/3 |
| 4,658,396 | 4/1987 | Barden | 370/16 |
| 4,680,581 | 7/1987 | Kozlik et al. | 370/85 X |
| 4,763,320 | 8/1988 | Rudolph et al. | 370/85 |

OTHER PUBLICATIONS

MIL-STD-1553 Hookup for Terminals, Peripherals, *Military Electronics/Countermeasures,* vol. 5, No. 4, Apr. 1979, pp. 42–47.

"Rugged Local Network Follows Military Aircraft Standard", *Electronics,* vol. 55, No. 7, 1982, pp. 147–149.

*Primary Examiner*—Stephen C. Buczinski
*Assistant Examiner*—Bernarr Earl Gregory
*Attorney, Agent, or Firm*—Edward J. Radlo; Harry G. Weissenberger; Keith L. Zerschling

[57] ABSTRACT

A repeater for local area networks of the MIL-STD-1553B type allows extension of the LAN to remote terminals. The repeater terminates the dual LAN buses and interfaces them with a single remote bus. Normally, the repeater is transparent to all traffic in the receive direction from both buses of the LAN to the remote terminal. In response to appropriate command words from the LAN, however, the repeater automatically switches direction at the correct time to transmit traffic from the remote terminal to the active bus of the LAN as called for by the LAN protocol, and then switches back. Safeguards are provided to reinitialize the repeater if a message failure occurs or the remote terminal fails to respond to a command word.

6 Claims, 12 Drawing Sheets

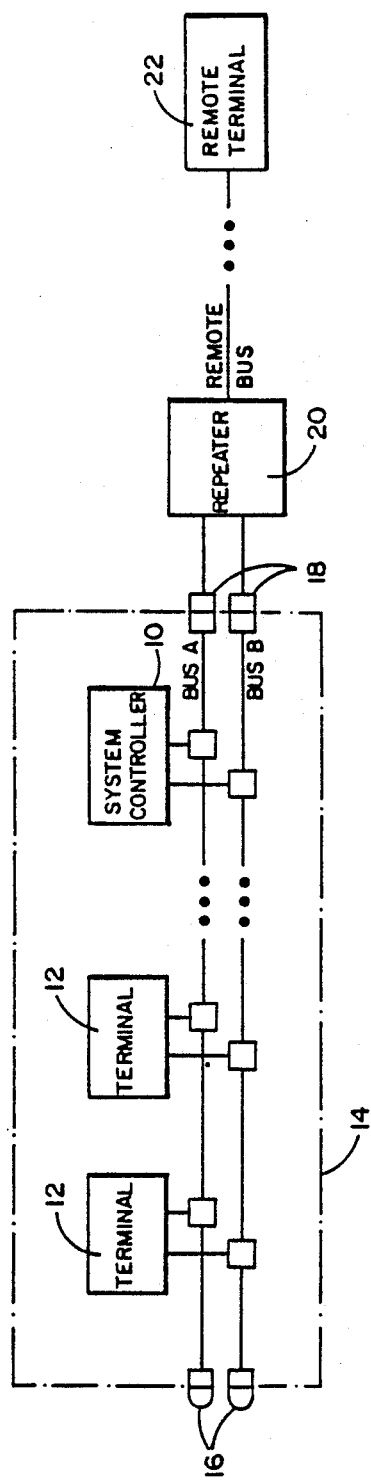
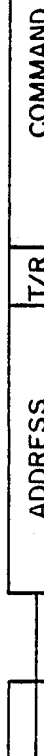
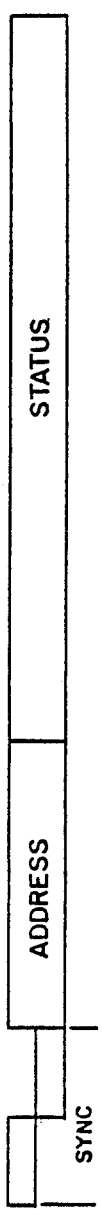
FIG. 1
FIG. 2a COMMAND WORD
FIG. 2b STATUS WORD
FIG. 2c DATA WORD

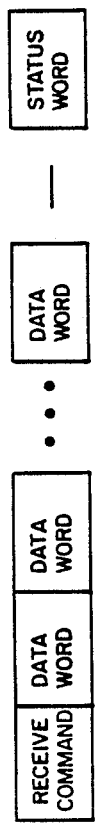
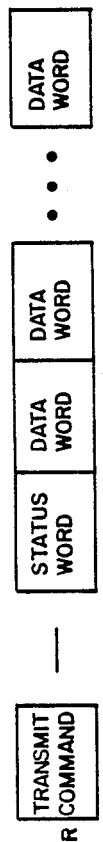
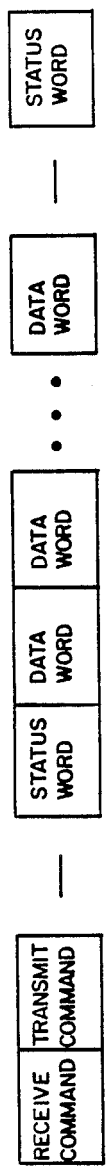
FIG. 3a
FIG. 3b
FIG. 3c

REPEATER FOR EXTENDING LOCAL AREA NETWORKS

FIELD OF THE INVENTION

This invention relates generally to the field of data communications, and more particularly to a repeater for overcoming the bus length limitations of a local area network such as a MIL-STD-1553B Aircraft Internal Time Division Command/Response Multiplex Data Bus communications system.

BACKGROUND OF THE INVENTION

MIL-STD-1553B defines the data communications protocol, data format and the electrical characteristics of a local area network (LAN) for aircraft or other military vehicles. Typically, such a LAN includes transformers, transceivers, encoders, converters and terminal hybrids interconnected by a pair of redundant data buses.

To the extent concerning the present invention, LAN's of the MIL-STD-1553B type consist of a system controller and a plurality of terminals, all of which are capable of receiving and transmitting data over the buses, only one of which is active at any given time. All data transfers are initiated by the system controller. A data transfer is initiated when the system controller places a command word on the bus. The terminal addressed by the command word is either commanded to receive a message (herein termed a "RECEIVE" transfer) or to transmit a message (a "TRANSMIT" transfer). The addressed terminal responds with a status word. In a "RECEIVE" transfer, the message follows the command word. In a "TRANSMIT" transfer, it follows the status word.

Messages must not exceed a predetermined maximum number of data words (32 data words in the case of MIL-STD-1553). Command words and status words contain a synchronization code decodable as positive sync, while data words have a code decodable as negative sync.

If a plurality of redundant buses are used in the system, a Manchester II bi-phase level data encoding format is preferably used, as this format can easily produce an indication of whether a given bus is currently active or idle.

The MIL-STD-1553-type data bus is designed to operate within a limited physical bus length which is sufficient for installations within an aircraft vehicle, or small building. It is sometimes desirable, however, to extend the bus to a remote location in order to test the system or temporarily provide it with additional capabilities. Because the remote facility is typically beyond the maximum reach of the 1553B data bus, a repeater becomes necessary.

A problem arises, however, from the fact that the typical MIL-STD-1553 type system has two mutually exclusive redundant buses but the remote facility often has only one. Consequently, interfacing between the local area system and the remote facility was previously quite difficult and required special programming. Also, the necessary bidirectional repeating capability previously required two repeaters (one for each direction) for proper matching of each remote terminal.

SUMMARY OF THE INVENTION

The present invention provides a simple bidirectional repeater for connecting the dual buses of a MIL-STD-1553B type LAN to a single remote bus for extending the LAN to a remote terminal. The repeater of this invention uses digital hardware and requires no software or PROM programming.

A single set of transceivers allows traffic to be conveyed in either direction between the LAN and the remote terminal under the control of a timing circuit responsive to the command word from the LAN which initiates each data transfer operation. A time-out counter assures that the repeater reinitializes itself in the event of a message failure or a failure of the remote terminal to respond to a command from the LAN. The LAN bus inputs to the repeater are hybrids terminating the buses with the proper impedance.

More specifically, the timing circuit of this invention recognizes a command word by the first coincidence of "valid word" and "local address" pulses produced by the converter which decodes the words of the traffic. If the command word contains a "receive" bit, the circuit counts the fixed number of data words making up a message and then switches the traffic direction for one word length to allow transmission of the status word by the remote terminal. If the command word does not contain a "receive" bit, the circuit immediately switches traffic direction and does not switch back until the requisite number of data words following the status word have been counted.

The circuit is re-initialized or reset by the end of the remote terminal's response. A time-out counter runs continually between the command word and the end of the remote terminal's response. However, the timer is reset by each occurrence of a valid word so that it cannot time out unless a message failure occurs or the remote terminal fails to respond. If this happens, the time-out counter times out and produces a reset or re-initialization of its own.

The timing circuit of this invention responds only to command and status words which contain its local address. Consequently, the repeater in effect ignores any command or status words carrying the address of another terminal, as in the case of a terminal-to-terminal transfer.

Provision is made in the repeater for detecting activity on one of the LAN buses. Responses from the remote terminal are transmitted only over that bus if it is active, and only over the other bus if it is not active. The transceiver associated with the bus which is not used remains switched to the receive direction throughout.

BRIEF DESCRIPTION OF THE DRAWING

FIG. 1 is a block diagram illustrating the environment in which the preferred embodiment of the invention is designed to operate;

FIG. 2a is a schematic representation illustrating the structure of a command word in the system of FIG. 1;

FIG. 2b is a schematic representation illustrating the structure of a status word in the system of FIG. 1;

FIG. 2c is a schematic representation illustrating the structure of a data word in the system of FIG. 1;

FIG. 3a illustrates the sequence of words in a data transfer from the system controller to a remote terminal of FIG. 1;

FIG. 3b illustrates the word sequence in a data transfer from a remote terminal to the system controller of FIG. 1;

FIG. 3c illustrates the word sequence in a data transfer between two terminals of the system of FIG. 1;

DESCRIPTION OF THE PREFERRED EMBODIMENTS

Figure 4A:
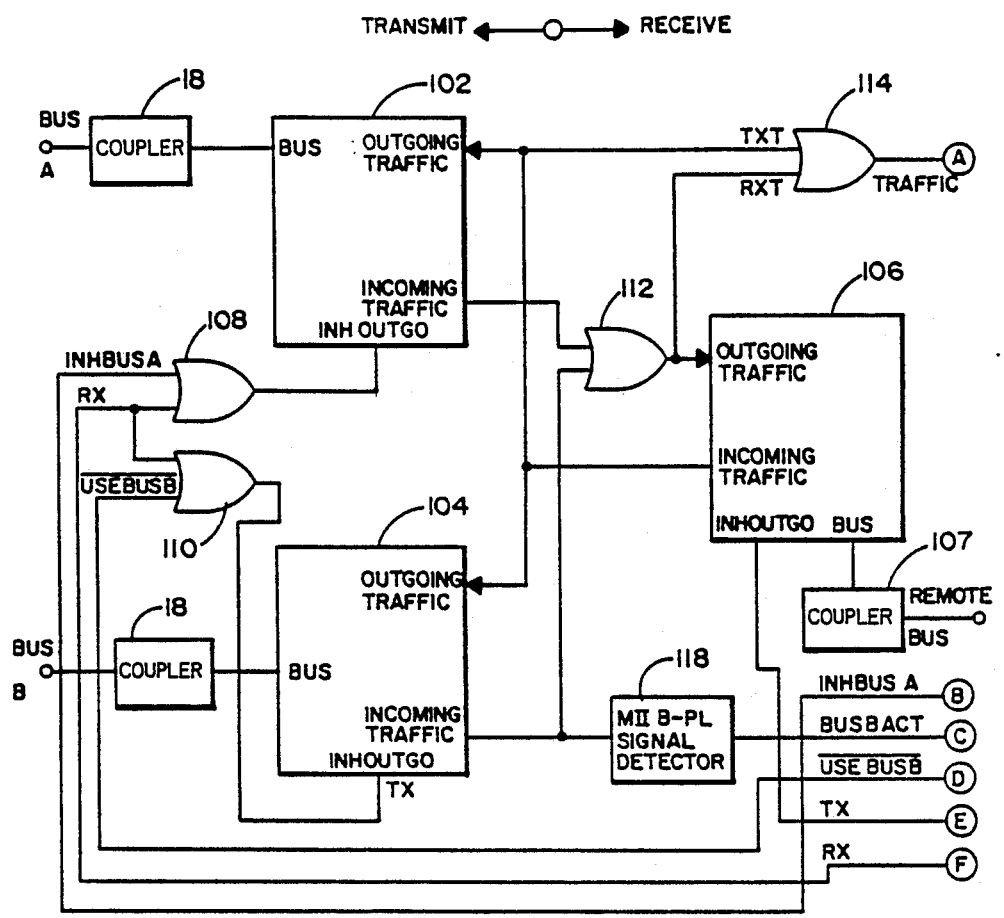
FIGS. 4a through 4c together constitute a logic diagram of the repeater of this invention.
Figure 4:
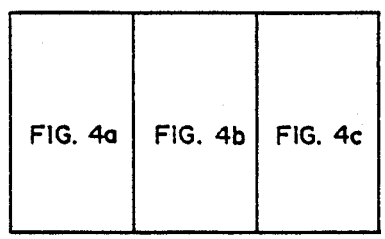
FIG. 4 is a diagram illustrating the manner in which FIGS. 4a through 4c fit together to form a single figure.

FIG. 1 is an overall block diagram of a data transmission system using the present invention. Two redundant LAN buses A and B (only one of which is active at any given time) interconnect a system controller 10 and a plurality of terminals 12 inside a local area 14 which may be, for example, an aircraft, vehicle, or building. At the boundaries of the local area 14, the buses A and B may be terminated either by terminators 16 of appropriate impedance, or by a repeater 20 which also present an appropriate impedance to buses A and B. One or more repeaters 20 may be connected to the buses A and B and each repeater 20 may service a remote terminal 22 by way of a single remote bus.

A typical system of this type would be a MIL-STD-1553B system in which the buses A and B are so designed as to be capable of transmitting signals only over a limited distance. Consequently, if a remote terminal located at a distance in excess of the capability of buses A and B is to be connected to the system, a repeater is necessary. Inasmuch as distant remote terminals generally do not need the redundancy of the system itself, a conversion within the repeater from a two-bus operation to a single-bus operation is needed. Also, it is desirable to make the repeater capable of bi-directional operation within the parameters of the system so that it is not necessary to provide a separate repeater for each direction of traffic. The present invention is designed to accomplish that result.

The parameters of the system in which this invention is used are illustrated in FIGS. 2a, b, c, and 3a, b, c. FIGS. 2a, b, c illustrate the structure of the words which make up the system traffic. FIG. 2a shows a command word issued by a system controller which contains a positive-sync bit combination followed by a terminal address, a transmit/receive bit, and a specific type of command. FIG. 2b illustrates a status word which is the reply by the terminal. The status word also has a positive-sync bit combination and the addresses of the terminal, but instead of the transmit/receive bit and command of the command word, the remainder of the status word is reserved for various status information.

FIG. 2c illustrates a data word which begins with a negative-sync bit combination and then contains whatever data is being transferred.

The sequence of a data transfer operation is illustrated in FIGS. 3a through 3c. FIG. 3a shows a transfer from the system controller to a terminal. In this instance, the system controller transmits a receive command word followed by a number of data words (up to 32 data words in the case of MIL-STD-1553). The terminal then replies with a single status word.

FIG. 3b illustrates a data transfer from a terminal to the system controller. In this instance, the controller issues a transmit command word, and the terminal replies with a status word followed by the fixed number of data words.

FIG. 3c illustrates terminal-to-terminal transfers. In this instance, the system controller issues a receive command word addressed to the receiving terminal, followed by a transmit command word addressed to the transmitting terminal. The transmitting terminal replies with a status word followed by the fixed number of data words.

Figure 4B:
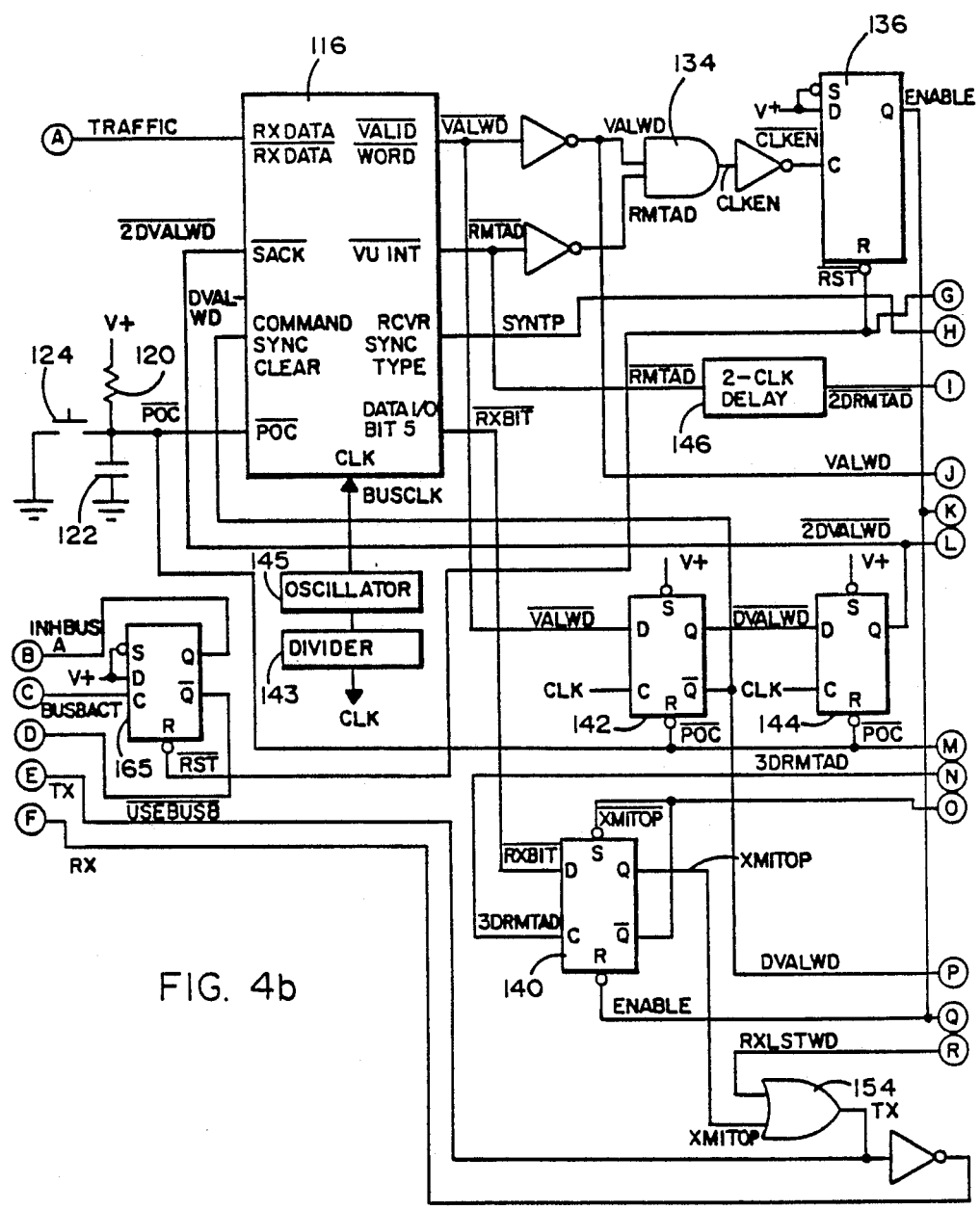
Figure 4C:
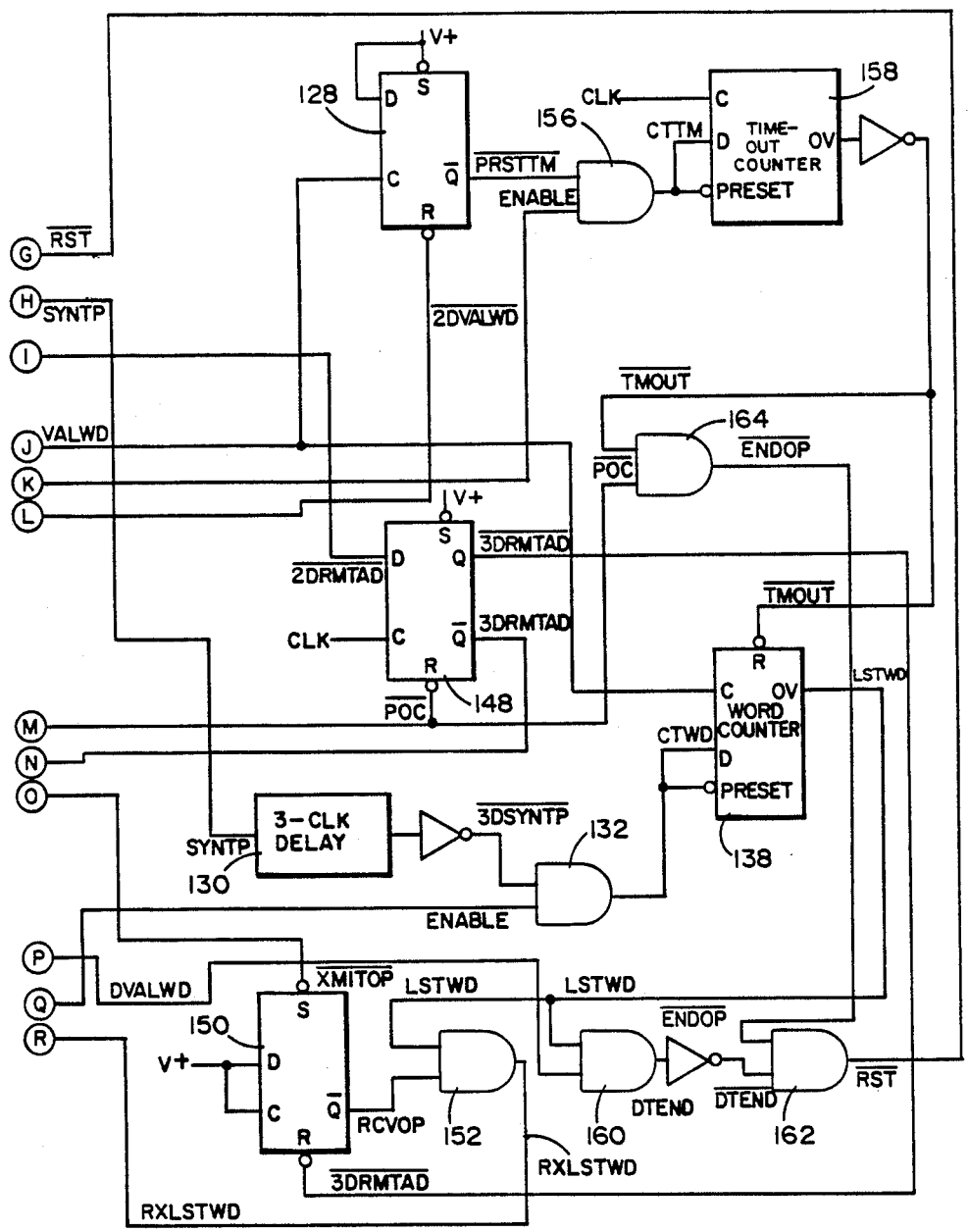
Figure 5A:
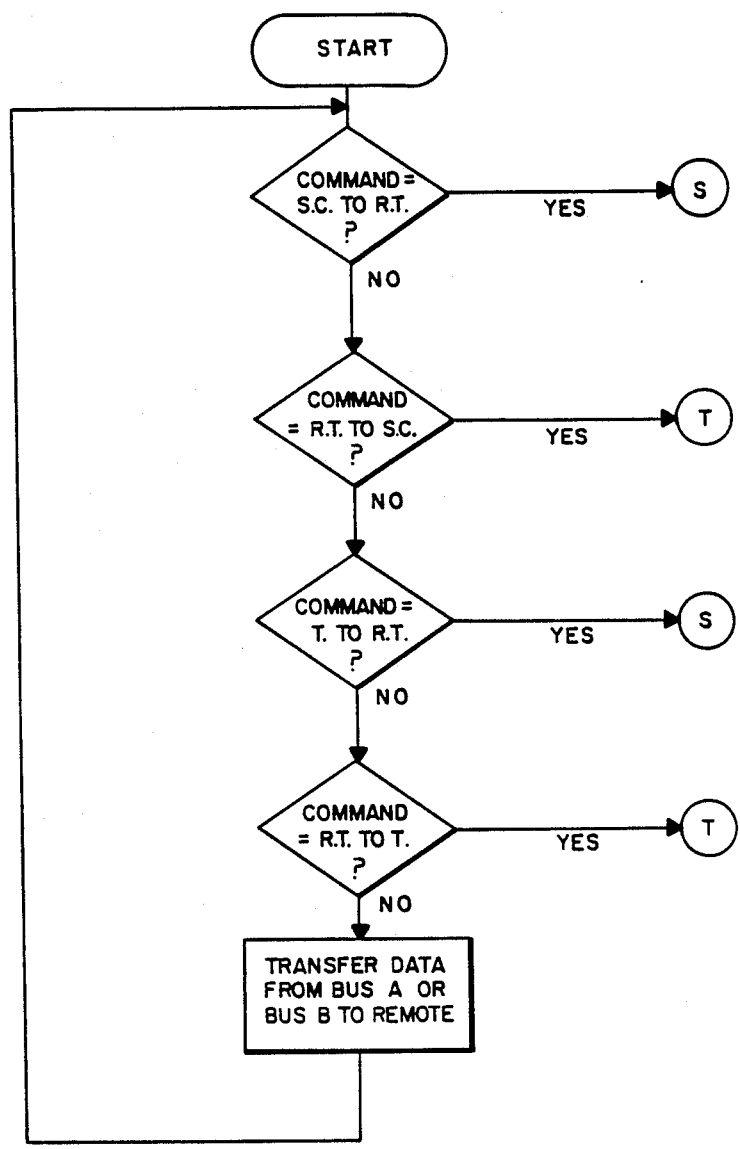
FIGS. 5a through 5d are flow charts illustrating the logic decisions made by the circuit of FIGS. 4a through 4c.
Figure 5B:
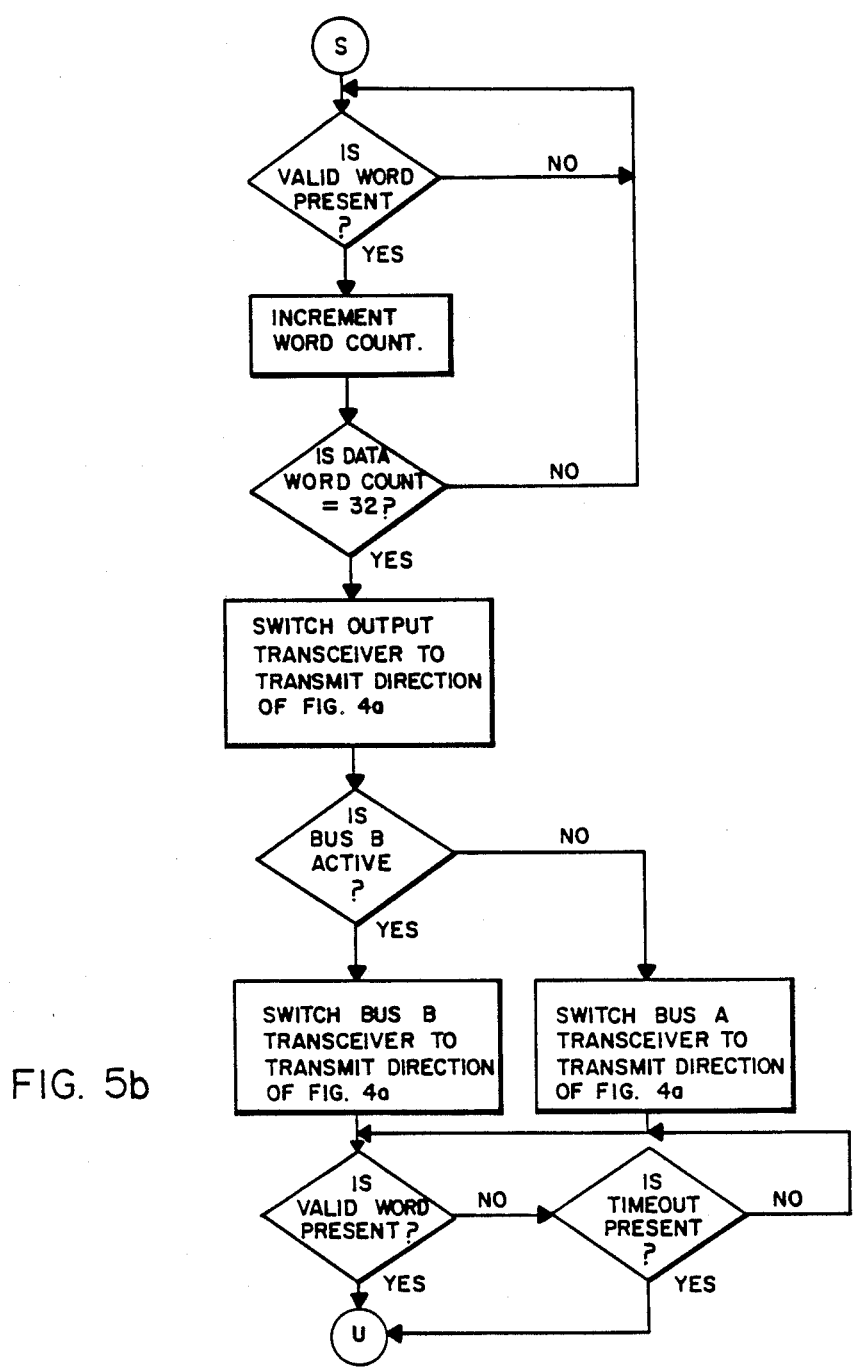
Figures 5C, 5D:
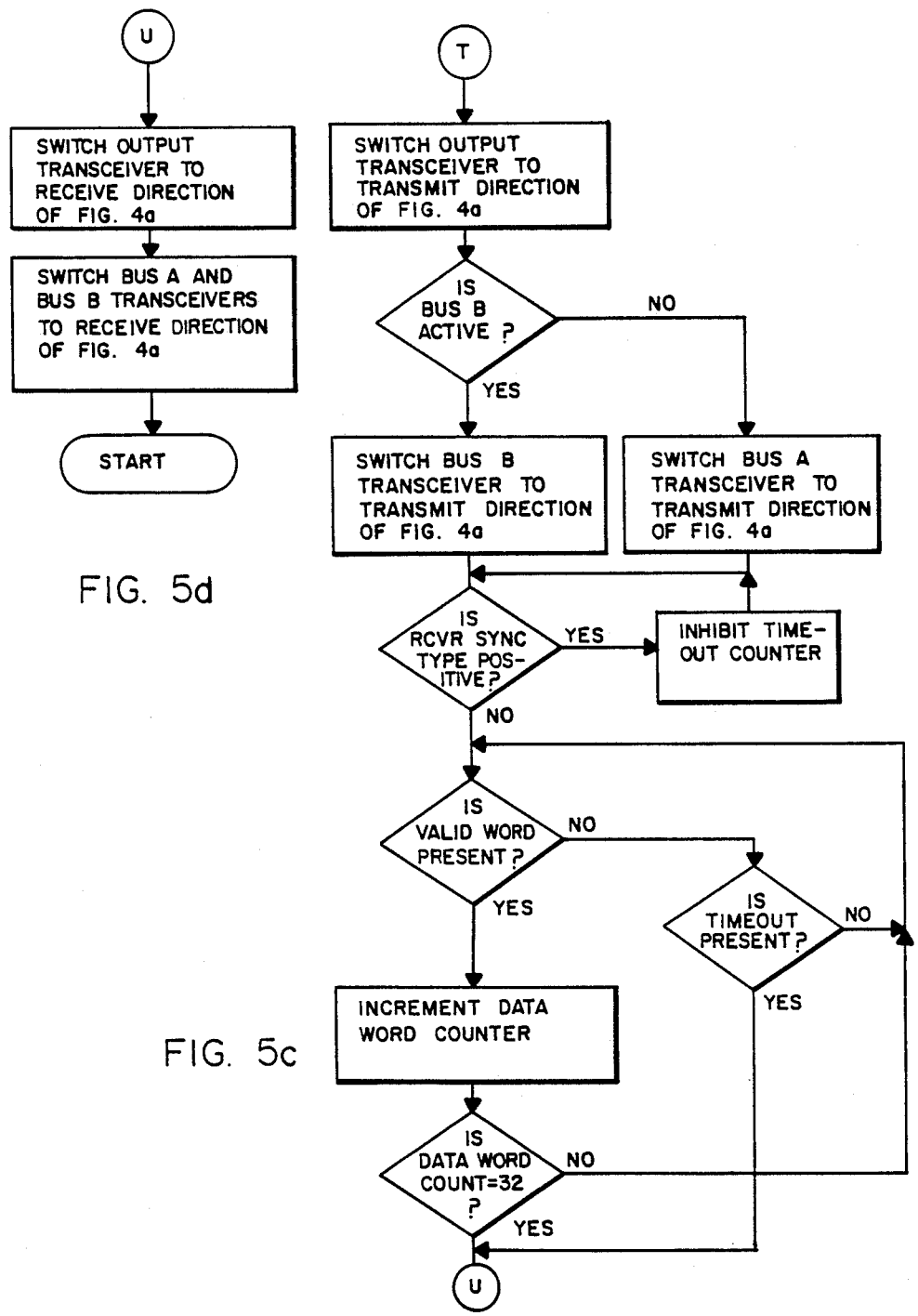

FIGS. 4a through 4c show the details of the repeater logic. Its functioning is best understood by examining the operation of the circuit in connection with various types of data transfers. The mnemonics used in FIGS. 4a through 4c and 6a through 6d are chosen to indicate the function performed by the signal, and whether it is active high or active low. Thus, for example, $\overline{VALWD}$ is a signal which goes high when a valid word has been identified, while $\overline{RST}$ is the signal which resets the circuitry when it goes low.

Referring first to FIG. 4a, LAN buses A and B are connected, respectively, to a pair of transceivers 102, 104 through coupler transformers 18 which terminate the buses with their characteristic impedance. Each of these transceivers is capable of handling either outgoing traffic toward bus A or bus B, respectively, or incoming traffic from those buses. In the case of transceivers 102, 104, the outgoing direction is the direction marked "TRANSMIT" in FIG. 4a, i.e. the direction from the remote bus to bus A or bus B. The incoming traffic in transceivers 102, 104 is the traffic in the direction marked "RECEIVE" in FIG. 4a, i.e. the direction from bus A or bus B to the remote bus.

A third transceiver 106 is connected to the remote bus through an appropriate coupler 107. It will be seen that in the transceiver 106 the outgoing traffic is the traffic in the RECEIVE direction while the incoming traffic is the traffic in the TRANSMIT direction. Each of the transceivers 102, 104 and 106 handles only outgoing traffic unless a high signal is applied to its INH OUTGO (inhibit outgoing traffic) terminal, in which case it switches to handle only incoming traffic. In order to convey traffic in the TRANSMIT direction, the INH OUTGO signal of transceiver 106 must be high, whereas it must be low in one or the other of transceivers 102 or 104. In order to convey traffic in the RECEIVE direction (the normal stand-by condition of the repeater 20), INH OUTGO must be high in transceivers 102 and 104, and low in transceiver 106. This switching is accomplished by the RX (receive) and TX (transmit) signals which will be discussed in more detail in connection with FIG. 4b.

The selection of either bus A or bus B for the transmission of traffic to the LAN is determined by the presence or absence of traffic on bus B since the previous data transfer operation. As discussed in more detail below, the presence of traffic on bus B generates a USE-BUSB (use bus B) signal and an INHBUSA (inhibit bus A) signal of opposite level. These signals are OR'd with the RX signal in gates 108, 110. Consequently, during a TRANSMIT operation (when RX is low and TX is high) the INH OUTGO signal is low on one of transceivers 102, 104 and high on the other. Transceiver 106 and the transceiver of the active bus therefor operate in the TRANSMIT direction while the transceiver of the inactive bus continues to operate in the RECEIVE direction. During a RECEIVE operation (RX high, TX low) all three transceivers 102, 104, and 106 operate in the RECEIVE direction.

The incoming traffic from transceivers 102, 104 is OR'd in gate 112 and is applied to transceiver 106 as its outgoing traffic to the remote bus. Conversely, the incoming traffic of transceiver 106 from the remote bus is applied as outgoing traffic to both transceivers 102 and 104.

The outgoing and incoming traffic signals TXT (TRANSMIT traffic) and RXT (RECEIVE traffic) of transceiver 106 are OR'd in gate 114 to produce a TRAFFIC signal which is applied to the converter 116 (FIG. 4b). Incoming traffic from bus B while transceiver 104 is switched to the RECEIVE direction is sensed by the signal detector 118 which produces a BUSBACT (bus B active) signal which is used in a manner hereafter discussed to generate the $\overline{\text{USEBUSB}}$ and INHBUSA. In the case of a MIL-STD-1553B system the signal detector 118 may be a conventional Manchester II bi-phase level detector; in other systems, other appropriate conventional signal detectors may be used.

It will be noted that inasmuch as the repeater 20 automatically selects either bus A or bus B, depending on which one is active, the repeater 20 can be used as a single-bus-to-single bus repeater without modifications; nor does it matter whether the single bus in this instance is bus A or bus B.

Turning now to FIGS. 4b and 4c, the converter 116 may be, in the case of a MIL-STD-1553B system, a command response Manchester II converter, which is commercially available as an 8937 chip from ILC Data Device Corporation of Bohemia, N.Y. The structure and operation of this chip is detailed at pp. III-26 through III-30 of the ILC Data Device publication "MIL-STD-1553 Designer's Guide" (1982). The terminal designations of converter 116 in FIG. 4b are those of the 8937 chip. In systems other than MIL-STD-1553B, converters with similar outputs may of course be used.

The OR'd traffic from transceivers 102, 104 and 106 is applied to the RX DATA inputs of converter 116. Although the traffic in FIG. 4a has been depicted for simplicity as a single signal, its bi-phase nature makes it in reality a dual signal which is applied to the RX DATA and $\overline{\text{RX DATA}}$ inputs of converter 116, respectively. The converter 116 receives the traffic from either direction and decodes it. Each word of the traffic is stored in an inner buffer of the converter 116 and is analyzed to determine its synchronization type, validity and address. The converter 116 is conventionally associated with a set of address switches (not shown) which allow a selected address to be manually assigned to the repeater 20 at the time of installation.

In the system of this invention, the synchronization type of command words and status words must produce a high output at the RCVR. SYNC TYPE terminal of converter 116, while a data word must produce a low output at that terminal. If the address of the command or status word corresponds to the address of the repeater, a low-going pulse is produced at the $\overline{\text{VU INT}}$ output of converter 116. At all other times that output is high.

In the system of this invention, each command word must contain an indication in one of its bits (the T/R bit of FIG. 2a) as to whether a data transfer is to take place in the RECEIVE direction of the TRANSMIT direction of FIG. 4a. If the data transfer is to take place in the TRANSMIT direction, the DATA I/0 BIT 5 output of converter 116 must remain at its normal high level. If the data transfer is to take place in the RECEIVE direction, this output must go low for a short period of time following the identification of a command word as valid and properly addressed.

The $\overline{\text{SACK}}$ and COMMAND SYNC CLEAR inputs of the 8937 version of converter 116 must be pulsed momentarily following a valid word indication to reset the converter 116 for reception of the next word. A $\overline{\text{POC}}$ input of the converter 116 provides a power-on clear or master reset whenever power to the repeater is turned on following an interruption. The $\overline{\text{POC}}$ signal is preferably created by an RC network 120, 122 which permits a manual resetting of the system by a reset button 124.

OPERATION

Figure 6A:
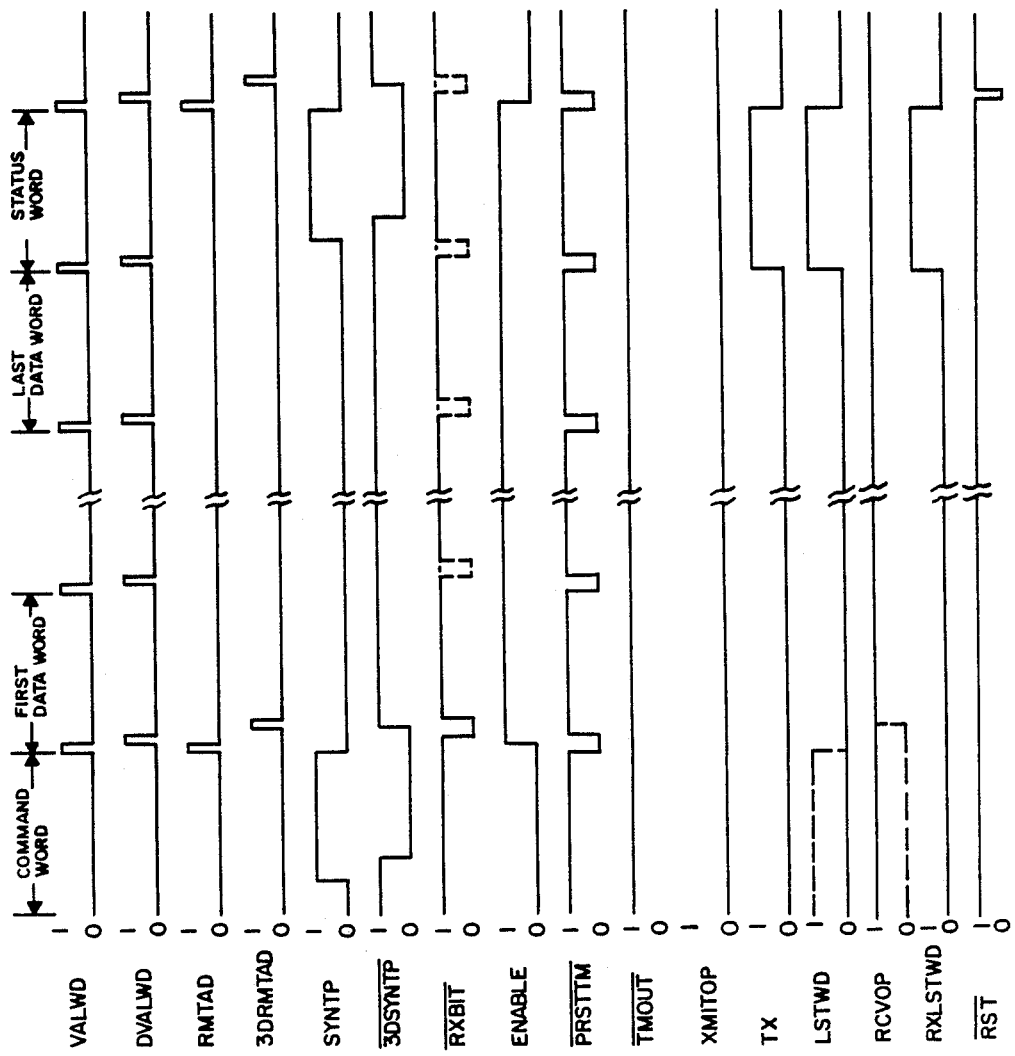
FIG. 6a is a timing diagram illustrating the relationship of various signals of the circuit of FIGS. 4a through 4c during a data transfer from the system controller to a remote terminal in FIG. 1.
Figure 6B:
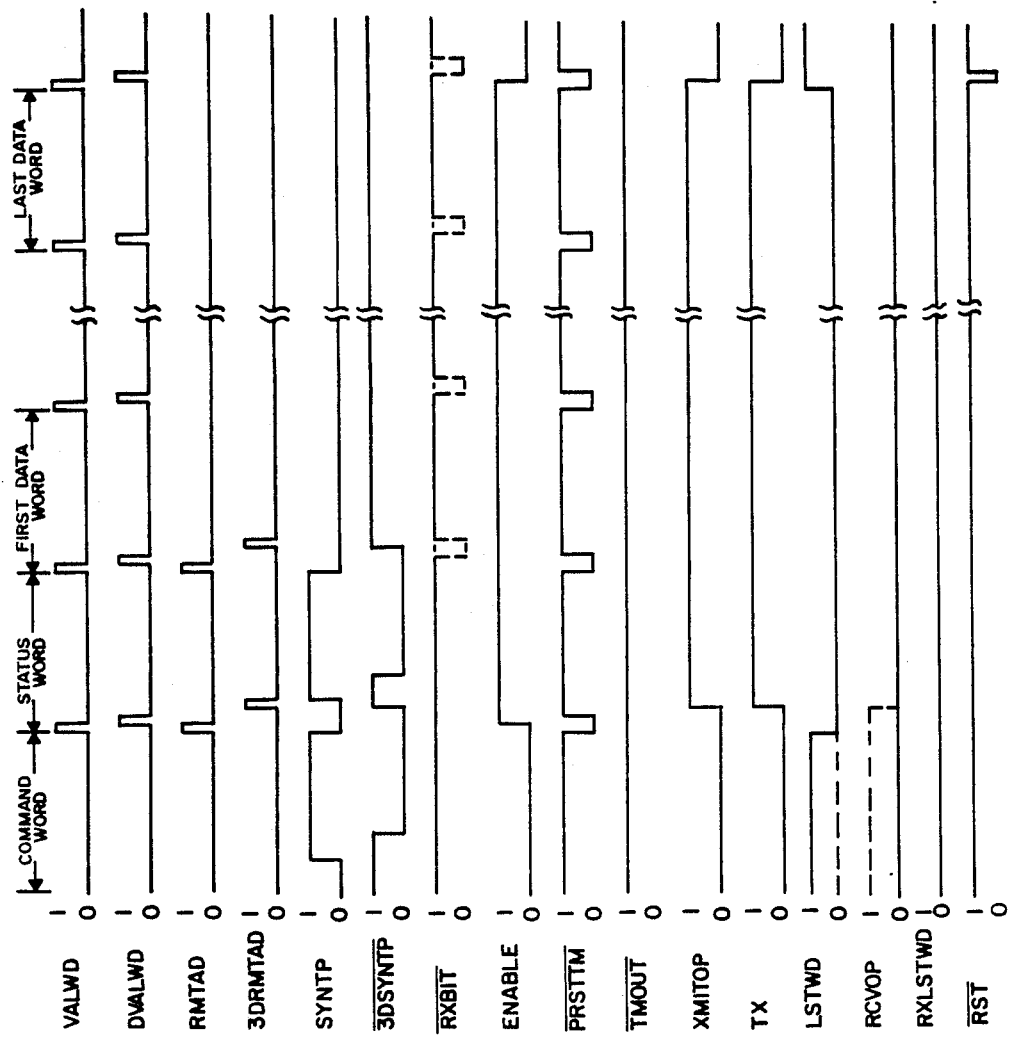
FIG. 6b is a timing diagram illustrating the relationship of various signals of the circuit of FIGS. 4a through 4c during a data transfer from a remote terminal to the system controller of FIG. 1.
Figure 6C:
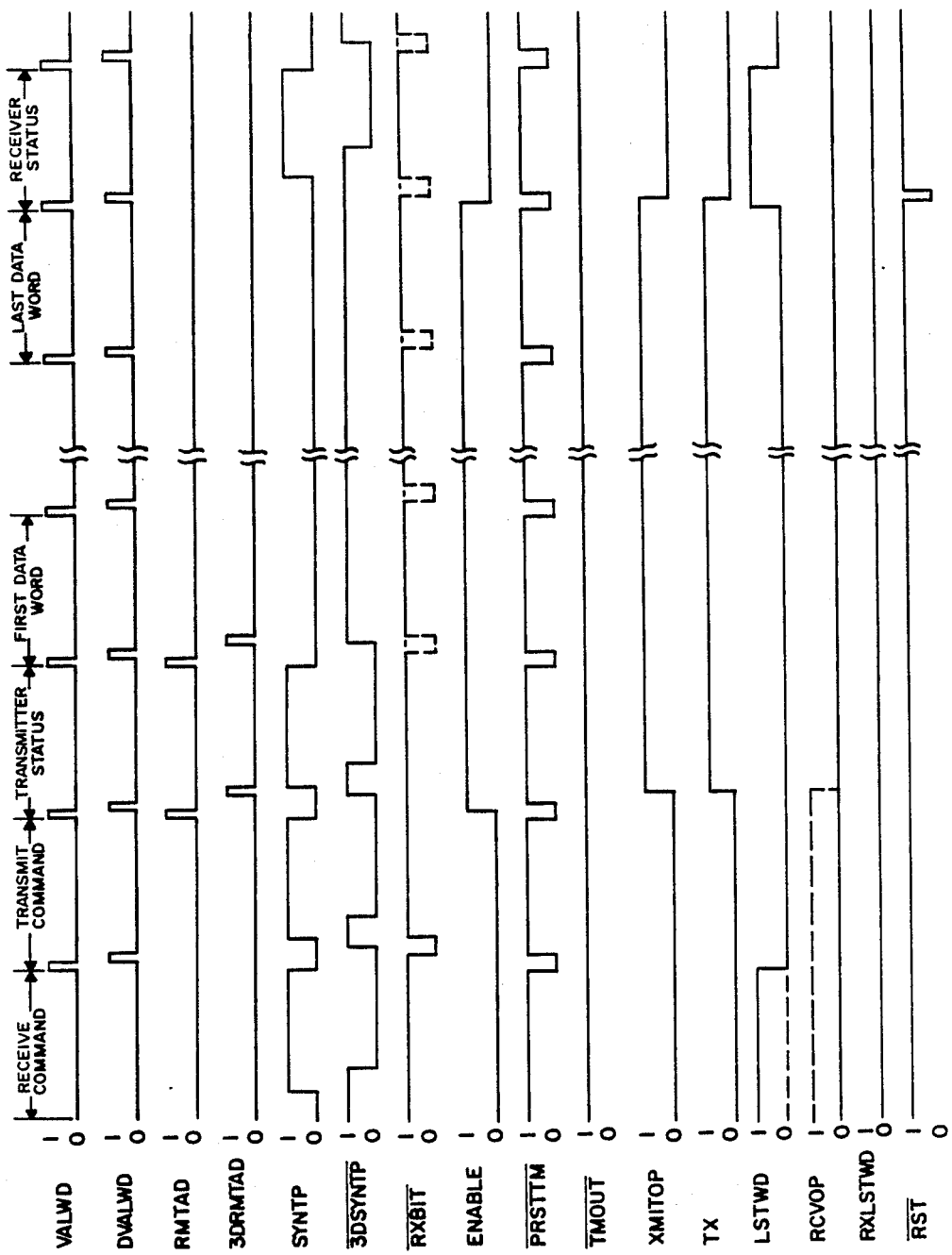
FIG. 6c is a timing diagram illustrating the relationship of various signals of the circuit of FIGS. 4a through 4c during a data transfer from a remote terminal to another terminal of FIG. 1.
Figure 6D:
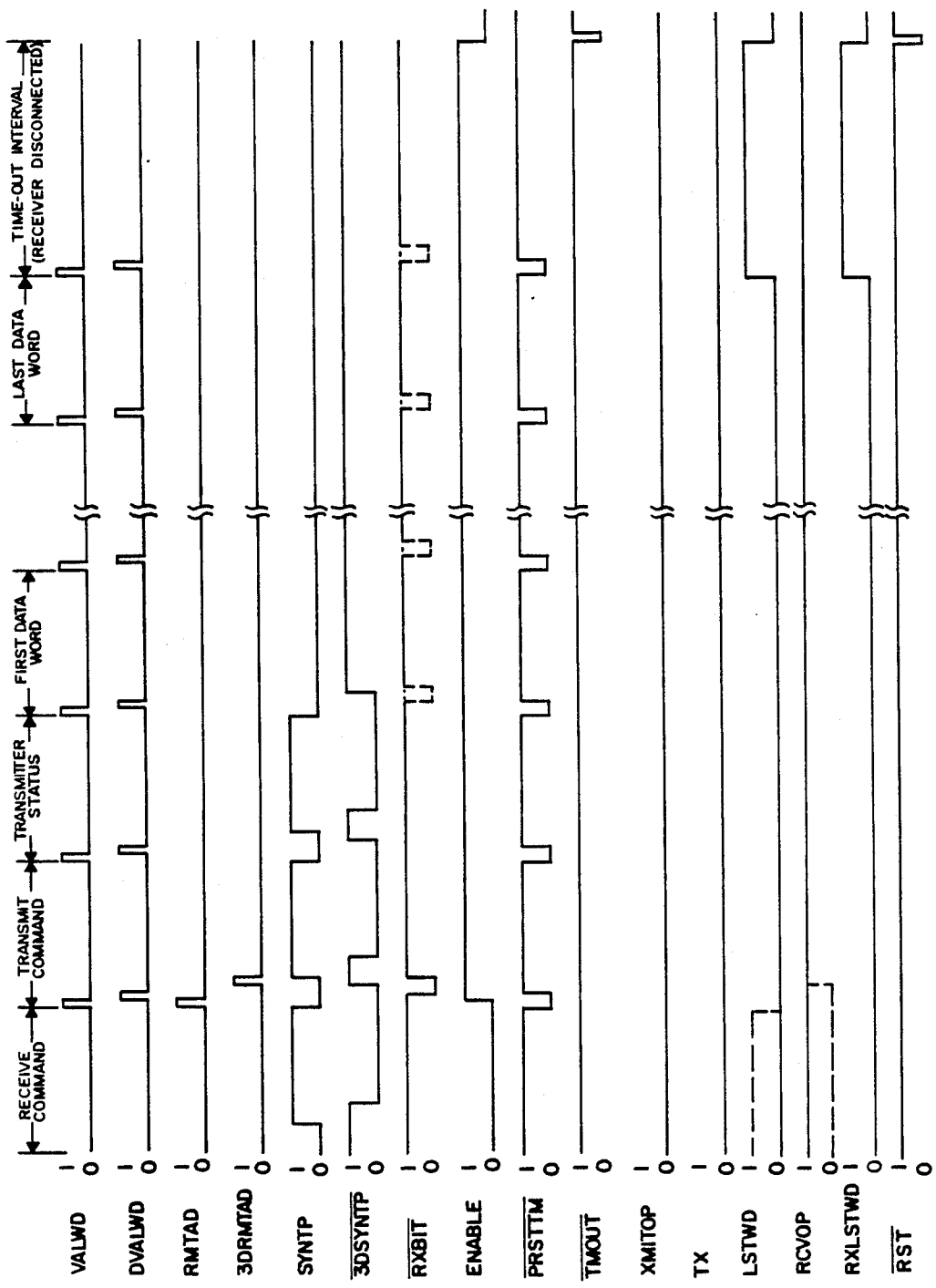
FIG. 6d is a timing diagram illustrating the relationship of various signals of the circuit of FIGS. 4a through 4c during an attempted data transfer from another terminal to a remote terminal of FIG. 1, in which the remote terminal of FIG. 1 fails to respond with its status word.

FIGS. 6a through 6d are timing diagrams which illustrate the time relationship of the various signals in FIGS. 4a through 4c in the course of the various types of data transfers. In this respect, FIG. 6a illustrates system controller-to-remote terminal transfer FIG. 6b illustrates a remote terminal-to-system controller transfer, FIG. 6c illustrates a transfer from the remote terminal associated with the repeater to another terminal, and FIG. 6d illustrates a transfer from another terminal to the remote terminal associated with the repeater. An examination of FIGS. 6a through 6d will be of help in following the operational description of FIGS. 4a through 4c now to be made.

1. Data transfer from system controller to a remote terminal (RECEIVE operation, FIG. 6a).

SYNTP (synchronization type) goes high at converter 116 when the command word appears. SYNTP is delayed in the three-clock-cycle delay 130 and inverted to produce a $\overline{\text{3DSYNTP}}$ which is applied to AND gate 132.

Following the receipt of the command word by converter 116, a $\overline{\text{VALWD}}$ (valid word) signal is produced by the converter 116 for one clock cycle (typically 1 μs. Simultaneously, if the address of the command word corresponds to the repeater's address, a $\overline{\text{RMTAD}}$ (remote terminal address) signal is produced by the converter 116. These signals are inverted and AND'ed in gate 134 to produce a CLKEN (clock ENABLE) pulse. This signal is inverted and applied to the clock input of enable flip-flop 136 whose D input is permanently high. Consequently, the coinciding trailing edges of $\overline{\text{VALWD}}$ and $\overline{\text{RMTAD}}$ set the enable flip-flop 136. The setting of enable flip-flop 136 causes the $\overline{\text{ENABLE}}$ signal to go low. However, this has no immediate effect as the SYNTP signal will not have another rising edge until the next command or status word. The ENABLE signal of flip-flop 136, however, goes high and provides the second high input to AND gate 132. This causes the D input of word counter 138 to go high so as to enable the word counter 138. Simultaneously, the high level of the ENABLE signal removes the reset latch of T/R bit flip-flop 140 and enables it to function.

The ENABLE signal is applied to one input of AND gate 156, whose other input from the Q output of timer flip-flop 128 is $\overline{\text{PRSTTM}}$ (preset timer). Because flip-flop 128 is set by VALWD and reset by $\overline{\text{2DVALWD}}$, $\overline{\text{PRSTTM}}$ is normally high and goes low only for a two clock cycle interval following the onset of each VALWD pulse.

As long as the CTTM (count time) output of AND gate 156 is low, time-out counter 158 remains preset to a starting count. When ENABLE goes high, the time-out counter 158 starts counting. Before it can overflow, however, the next VALWD pulse momentarily lowers $\overline{\text{PRSTTM}}$ and presets counter 158 back to its starting count.

If any word (status or date) fails to appear before ENABLE goes low again (e.g. in case of a bus failure, a disconnected remote terminal, or a message containing less than the maximum number of data words) the time-out counter 158 eventually overflows (see FIG. 6d). This causes $\overline{\text{TMOUT}}$ (time out) and $\overline{\text{ENDOP}}$ (end operation to go low at AND gate 164, whereupon $\overline{\text{RST}}$ (reset) goes low. The activation of $\overline{\text{RST}}$ removes ENABLE, and time-out counter 158 presets again. At the same time, TMOUT also resets word counter 138.

The $\overline{\text{VALWD}}$ signal is delayed one clock cycle and inverted in CSC flip-flop 142 to produce the required DVALWD signal input to the COMMAND SYNCH CLEAR input of converter 116, and is delayed another clock cycle but not inverted in SACK flip-flop 144 to provide the required $\overline{\text{2DVALWD}}$ to the $\overline{\text{SACK}}$ input of converter 116. Flip-flops 142, 144 and 148, as well as time-out counter 158, are clocked by a CLK (clock) signal, typically a 1 MHz pulse train, which is preferably derived through a divider 143 from the faster converter clock (typically 12 MHz) which clocks the converter 116, and which is generated by a clock oscillator 145 in a conventional manner.

$\overline{\text{RMTAD}}$ is delayed by two clock cycles in the two-clock delay 146 to produce a 2DRMTAD pulse. This pulse is in turn applied to transmit flip-flop 148 which delays it an additional clock cycle and produces 3DRMTAD and $\overline{\text{3DRMTAD}}$ outputs, respectively. The 3DRMTAD output of transmit flip-flop 148 is applied to the clock input of T/R bit flip-flop 140. However, during a receive operation, $\overline{\text{RXBIT}}$ is low when the leading edge of 3DRMTAD occurs, so that T/R bit flip-flop 140 remains reset. The reset condition of T/R bit flip-flop 140 causes $\overline{\text{XMITOP}}$ (TRANSMIT operations) to be high, thus allowing the word count flip-flop 150 to be reset by the 3DRMTAD pulse.

In the reset condition of word count flip-flop 150, RCVOP (RECEIVE operation) is high. Consequently, when the word counter 138 counts the last word of a message (the 32nd word in MIL-STD-1553) LSTWD (last word) goes high and so does RXLSTWD (RECEIVE operation last word) at gate 152. RXLSTWD makes TX go high at the OR gate 154, and the transceivers 106 and 102 or 104 of FIG. 4a switch to the TRANSMIT direction.

In some time-out situations (particularly when the remote terminal is disconnected and therefore fails to produce a status word in a RECEIVE transfer, the $\overline{\text{RST}}$ pulse may occut during the next command word. This does not matter, however, as the functions affected by the $\overline{\text{RST}}$ pulse do not commence until the command word has ended.

One clock cycle after the onset of the last VALWD pulse, DVALWD goes high and produces a DTEND (data end) signal at AND gate 160. With $\overline{\text{TMOUT}}$ and $\overline{\text{POC}}$ normally high, $\overline{\text{ENDOP}}$ (end operation) is normally high also, as is $\overline{\text{DTEND}}$. The coincidence of LSTWD and DVALWD at gate 160 causes $\overline{\text{DTEND}}$ at AND gate 162 to momentarily go low and thus produce a momentary $\overline{\text{RST}}$. This $\overline{\text{RST}}$ pulse resets enable flip-flop 136 and bus selection flip-flop 165. The resulting termination of the ENABLE signal also resets T/R bit flip-flop 140 if it is not already reset.

The end of the ENABLE signal also removes CTWD (count words) from the D input or word counter 138 and presets word counter 138 to an appropriate initial count. As a result, LSTWD goes low at word counter 138, causing RXLSTWD to also go low at gate 152. TX accordingly goes low at gate 154, and transceivers 106 and 102 or 104 switch back to the receive direction in FIG. 4a. The circuit is now re-initialized to perform the next data transfer operation.

In the event that the remote terminal is disconnected or out of service, no status word will appear in the traffic. Consequently, there will be no coincidence of LSTWD and DVALWD at gate 160 and no reset will occur. However, after an appropriate length of time, the time-out counter 158 will overflow and $\overline{\text{TMOUT}}$ will go low at AND gate 164, causing a time-out reset as previously described.

The proper LAN bus for the TRANSMIT operation is selected by bus selection flip-flop 165, which is reset on each $\overline{\text{RST}}$ pulse and is set by the jitter of the BUS-BACT signal produced by detector 118 whenever there is bi-phase traffic on bus B. This results in a high INH-BUSA and a low USEBUSB signal when bus B is active following a $\overline{\text{RST}}$ pulse, and the reverse when B is inactive following a $\overline{\text{RST}}$ pulse.

2. Data transfer from remote terminal to system controller (Transmit Operation, FIG. 6b):

The initial response to the command word is the same as described above. However, in this instance, when 3DRMTAD appears, $\overline{\text{RXBIT0}}$ is high, and T/R bit flip-flop 140 sets. The set is maintained by $\overline{\text{XMITOP}}$ to prevent a reset by a data word. The setting of T/R bit flip flop 140 makes XMITOP go high. Consequently, TX goes high at gate 154, and transceivers 106 and 102 or 104 switch to the transmit direction. At the same time, the termination of $\overline{\text{XMITOP}}$ sets the word counter flip-flop 150, thus making RCVOP low and allowing 3DRMTAD to reset that flip-flop.

With word counter flip-flop 150 set, the appearance of LSTWD at the end of the last data word does not produce an RXLSTWD signal. Therefore, when the coincidence of LSTWD and the DVALWD pulse of the status word causes $\overline{\text{RST}}$ to go low, the resulting termination of ENABLE and consequent reset of T/R bit flip-flop 140 cause the termination of XMITOP and consequently of TX at gate 154. The circuit is now re-initialized for the next data transfer operation. If the remote terminal is out of service, no status word appears, and the circuit is reset by $\overline{\text{TMOUT}}$.

3. Terminal-to-terminal transfer (TRANSMIT transfer, FIG. 6c, or RECEIVE transfer, FIG. 6d):

In a terminal-to-terminal transfer, the first command word is a receive command to the receiving terminal. This word is ignored by the transmitting terminal because it is not addressed to the transmitting terminal.

The second command word is a transmit command to the transmitting terminal and produces the same effect in that terminal as a remote terminal-to-system controller transfer command. The third word is the status word of the transmitting terminal. The receiving terminal does not count the second command word as a data word because it cannot count a word unless $\overline{\text{3DSYNTP}}$ and ENABLE are simultaneously present at gate 132 when VALWD occurs. This does not happen during command and status words.

The final word in a terminal-to-terminal transfer is the status word of the receiving terminal (see FIG. 3c). The presence of the receiver status word causes the receiving terminal to close out the transfer in the same manner as when receiving data from the system controller (see FIG. 6a). The receiver status word is ignored by the transmitting terminal (FIG. 6c) because it does not have the transmitting terminal's address.

FIG. 6d also illustrates the time-out sequence which will occur if, for example, the receiving terminal has been disconnected and therefore fails to return the receiver status word.

FIGS. 5a through d are self-explanatory flow charts illustrating the logic decisions made by the circuitry of FIGS. 4a through 4c for the various types of data transfer described above.

I claim:

1. In a data communication system including a local area network having a pair of local buses, only one of which is active at any given time, a remote terminal having a single remote bus, and a repeater for interconnecting, at any given time, said remote bus with the currently active one of said local buses, the system being so structured that data transfer messages contain a fixed number of data words, a system controller of the local area network initiates a data transfer by issuing an address-containing command word, the remote terminal acknowledges by issuing an address-containing status word, and data words have a different synchronization than said command and status words, the improvement comprising said repeater including:
    (a) a switchable transceiver circuit arranged to identify said active bus and to selectably convey traffic between said remote bus and said currently active local bus in a transmit or a receive direction:
    (b) converter means connected to said transceiver means for decoding words of said traffic regardless of the direction of said traffic;
    (c) detecting means associated with said convertor for detecting whether a command word is a receive command or a transmit command;
    (d) direction switching means for switching said transceiver means from the receive direction to the transmit direction following a transmit command or the last data word after a receive command; and
    (e) reset means for switching said transceiver means from the transmit direction to the receive direction following a status word after a receive command or the last data word after a transmit command.

2. The repeater of claim 1, further comprising:
    (f) time-out means for initializing said repeater if valid words fail to appear in said traffic at intervals less than a predetermined time-out interval following a command word and prior to the operation of said reset means.

3. The improvement of the repeater of claim 1, in which said traffic includes, at different times, traffic from both of said pair of local buses in the receive direction.

4. The improvement of the repeater of claim 1, in which said transceiver circuit includes a pair of separate transceivers each associated with one of said pair of local buses, and said repeater further comprises:
    (f) monitoring means for monitoring traffic on one of said pair of local buses in the receive direction, said direction switching means being so arranged that the transceiver associated with the other of said pair of local buses remains in the receive direction when traffic is detected on said one of said local buses prior to the operation of said direction switching means.

5. The improvement of the repeater of claim 1, further comprising:
    (f) coupling means for terminating said local area network with its characteristic impedance at the input to said repeater.

6. The improvement of the repeater of claim 1, in which all of said means include only hardware.

* * * * *